United States Patent [19]

Smith

[11] Patent Number: 5,165,623
[45] Date of Patent: Nov. 24, 1992

[54] FISHING REEL SPOOL PROVIDING ELONGATE SLOTS FOR SECUREMENT OF A KNOTTED FISHING LINE

[76] Inventor: Douglas G. Smith, 2606 Sue St., Duncan, Okla. 73533

[21] Appl. No.: 729,191

[22] Filed: Jul. 12, 1991

[51] Int. Cl.$^5$ .................. A01K 89/00; B65H 75/28
[52] U.S. Cl. ............................. 242/322; 242/117; 242/125
[58] Field of Search ............ 242/322, 74, 117, 125.1, 242/125, 77.3; 254/DIG. 14

[56] References Cited

U.S. PATENT DOCUMENTS

| | | | |
|---|---|---|---|
| 866,855 | 9/1907 | Gay | 242/125.1 |
| 4,160,532 | 7/1979 | Demuth et al. | 242/125.1 |
| 4,301,979 | 11/1981 | Cavanagh | 242/117 |
| 4,739,945 | 4/1988 | Yokoe | 242/74 X |

FOREIGN PATENT DOCUMENTS 260421 10/1925 United Kingdom ............ 242/125

Primary Examiner—Daniel P. Stodola
Assistant Examiner—Tony A. Gayoso
Attorney, Agent, or Firm—Hugh E. Smith

[57] ABSTRACT

A fishing reel spool is defined along a central axis, with the spool defined as a cylindrical tubular member formed with parallel flanges at each end of the spool. The spool includes a spool wall, with an elongate slot directed therethrough. The slot arranged generally parallel to the axis. The slot includes a cylindrical entrance in communication with a diametrically aligned elongate longitudinal slot, wherein the cylindrical entrance receives a knot of a fishing line and the knot is directed interiorly of the cylindrical spool for securement of the fishing line permitting ease of mounting of the fishing line to the spool in a winding procedure.

1 Claim, 4 Drawing Sheets

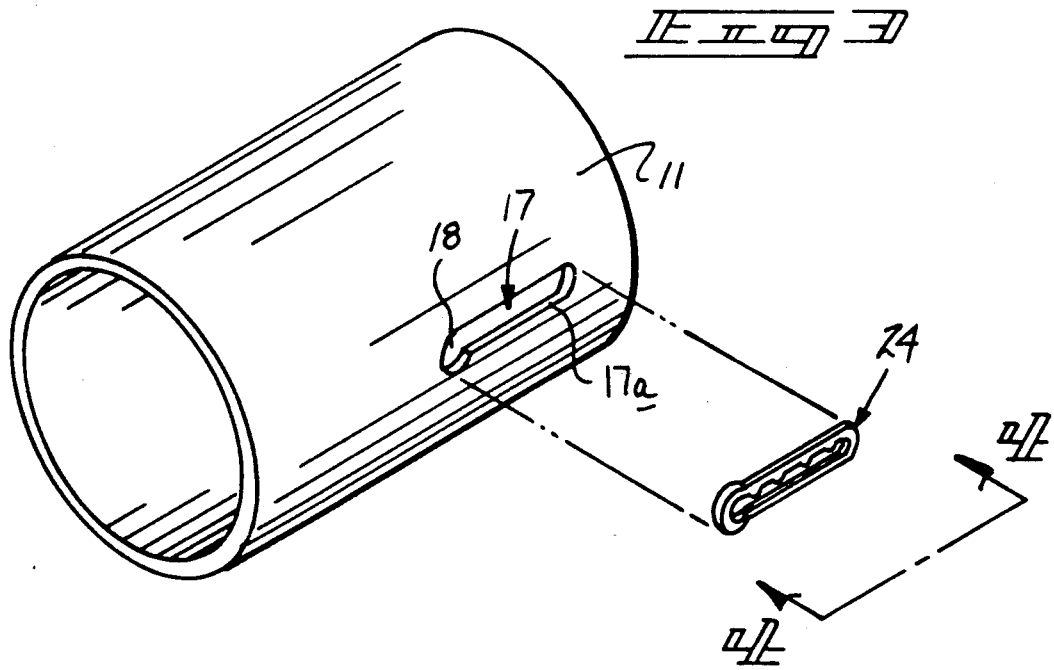
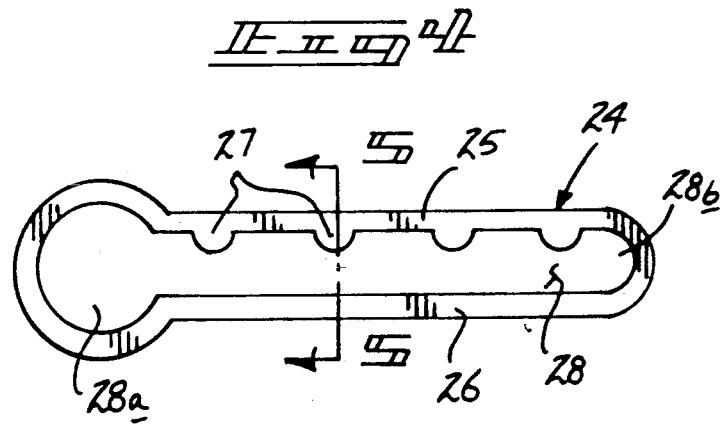
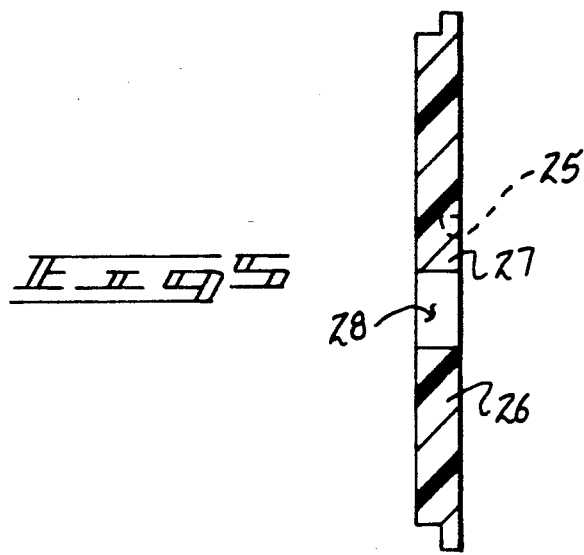

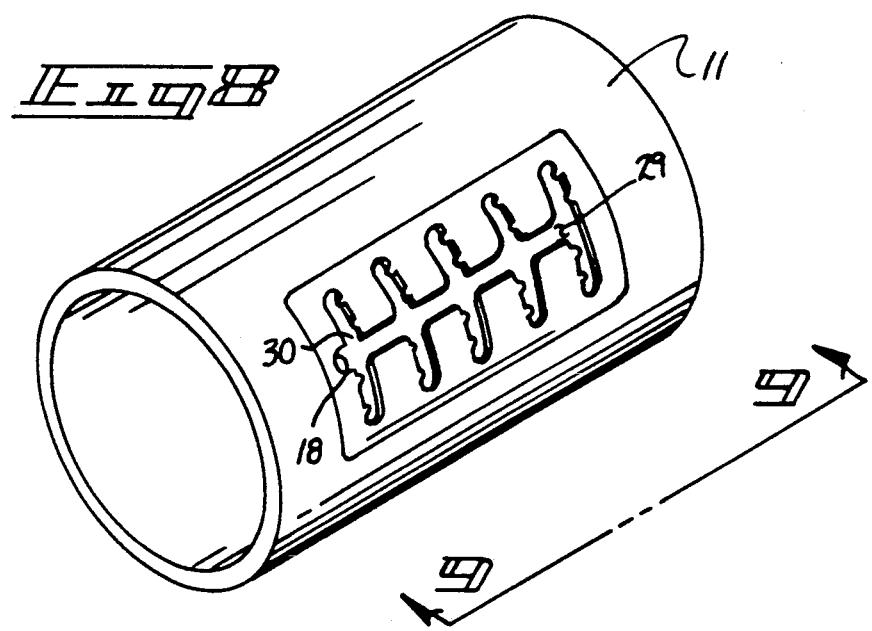
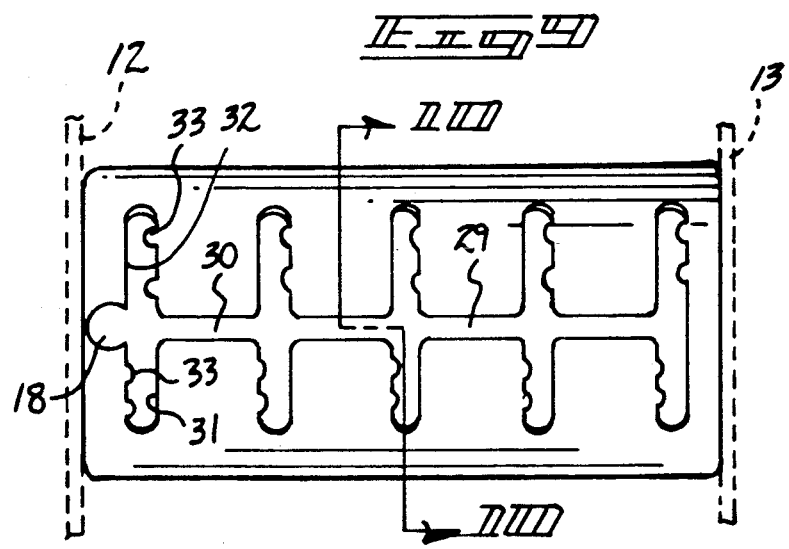
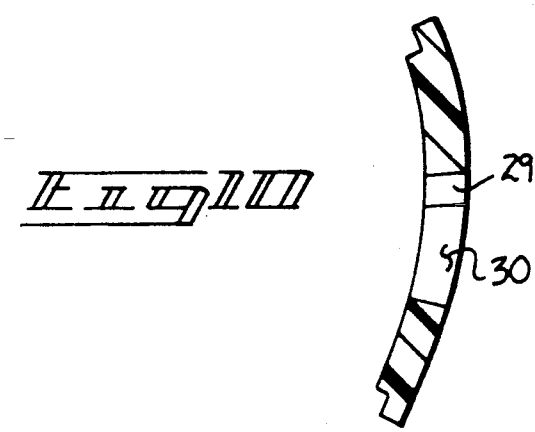

FISHING REEL SPOOL PROVIDING ELONGATE SLOTS FOR SECUREMENT OF A KNOTTED FISHING LINE

BACKGROUND OF THE INVENTION

1. Field of the Invention

The field of invention relates to fishing spools, and more particularly pertains to a new and improved fishing reel spool wherein the same is arranged for securement of a knotted fishing line therewithin.

2. Description of the Prior Art

The securement of a fishing line to a spool structure is typically an additional time expenditure requiring an individual to properly secure and adhere and associated fishing line about the central spool structure to permit subsequent winding of the fishing line about the spool.

To expedite mounting of the spool, the prior art has addressed this issue as exemplified in U.S. Pat. No. 2,777,648 to Wood wherein a central arbor mounted relative to a shaft is arranged for securement of a flexible line directed therethrough.

U.S. Pat. No. 2,404,702 to Fiori sets forth fishing reel, wherein the fishing reel includes a plurality of ribs along the spool for mounting of a fishing line thereon.

U.S. Pat. No. 2,842,322 to Bradshaw sets forth a fishing line reel, wherein the reel includes a recess mounted within a side flange of the spool for securement of the fishing line thereto.

U.S. Pat. No. 3,870,245 to Witteborg, Jr. sets forth a fishing spool arranged to receive a supply of stored line about an inner shaft, with an outer shaft consisting of an insert removably mounted on the spool in concentric relationship to the inner shaft to provide a reserve storage of line.

As such, it may be appreciated that there continues to be a need for a new and improved fishing reel spool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing spool apparatus now present in the prior art, the present invention provides a fishing reel spool wherein the same includes an elongate generally key shaped slot directed through the spool to receive and secure a fishing line to the spool. As such, the general purpose of the present invention, which will be described subsequently in greater detail, is to provide a new and improved fishing reel spool which has all the advantages of the prior art fishing spool apparatus and none of the disadvantages.

To attain this, the present invention provides a fishing reel spool defined along a central axis, with the spool defined as a cylindrical tubular member formed with parallel flanges at each end of the spool. The spool includes a spool wall, with an elongate slot directed therethrough. The slot arranged generally parallel to the axis. The slot includes a cylindrical entrance in communication with a diametrically aligned elongate longitudinal slot, wherein the cylindrical entrance receives a knot of a fishing line and the knot is directed interiorly of the cylindrical spool for securement of the fishing line permitting ease of mounting of the fishing line to the spool in a winding procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing reel spool which has all the advantages of the prior art fishing spool apparatus and none of the disadvantages.

It is another object of the present invention to provide a new and improved fishing reel spool which may be easily and efficiently manufactured and marketed.

It is a further object of the present invention to provide a new and improved fishing reel spool which is of a durable and reliable construction.

An even further object of the present invention is to provide a new and improved fishing reel spool which is susceptible of a low cost of manufacture with regard to both materials and labor, and which accordingly is then susceptible of low prices of sale to the consuming public, thereby making such fishing reel spools economically available to the buying public.

Still yet another object of the present invention is to provide a new and improved fishing reel spool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of an insert utilized by the invention.

FIG. 4 is an orthographic view, taken along the lines 4—4 of FIG. 3 in the direction indicated by the arrows.

FIG. 5 is an orthographic view, taken along the lines 5—5 of FIG. 4 in the direction indicated by the arrows.

FIG. 8 is an isometric illustration of a further modified slot structure utilized by the invention.

FIG. 9 is an orthographic view, taken along the lines 9—9 of FIG. 8 in the direction indicated by the arrows.

FIG. 10 is an orthographic view, taken along the lines 10—10 of FIG. 9 in the direction indicated by the arrows.

DESCRIPTION OF THE PREFERRED EMBODIMENT

Figure 1:
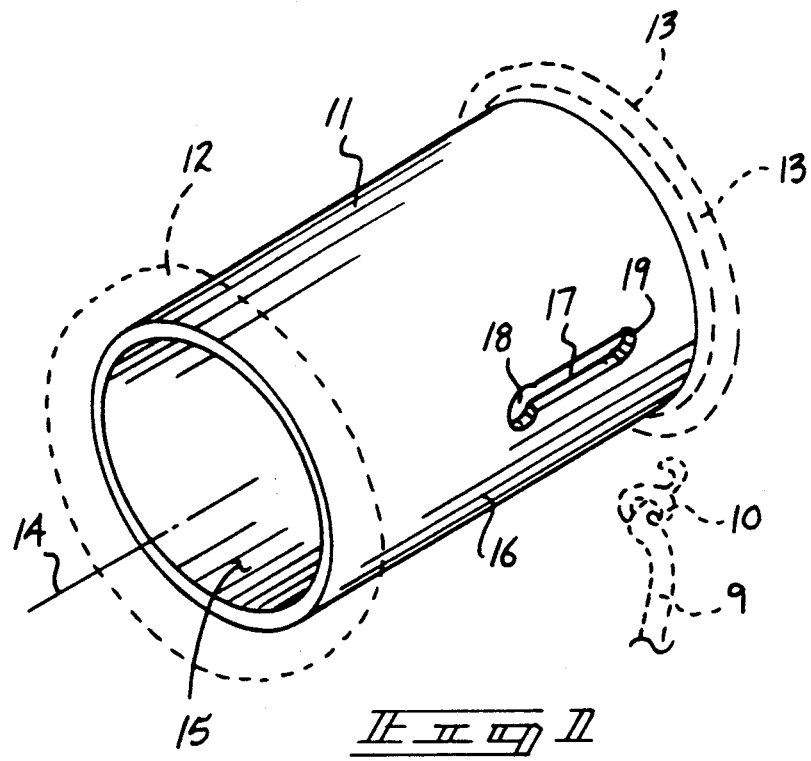
FIG. 1 is an isometric illustration of the instant invention.

With reference now to the drawings, and in particular to FIGS. 1 to 10 thereof, a new and improved fishing reel spool embodying the principles and concepts of the present invention and generally designated by the reference numeral 10 will be described.

More specifically, the fishing reel spool 10 of the instant invention essentially comprises a central cylindrical spool 11 defined along a spool axis 14 to include a respective first and second spool end flange 12 and 13 fixedly mounted at each opposed end of the central cylindrical spool 11 orthogonally oriented to the spool axis 14. The spool 11 includes a spool cavity 15 interiorly of the spool wall 16, with the spool wall 16 including an elongate enclosed slot 17 oriented parallel relative to the axis 14. The slot 17 includes a cylindrical slot first terminal end 18 positioned in a spaced relationship relative to the second spool end 13, with an elongate enclosed slot defined by a predetermined width and the cylindrical slot first terminal end 18 defined by a predetermined diameter greater than the predetermined width to permit directing of a knot 10 of a fishing line 9 through the cylindrical slot first terminal end 18 and thereafter slide the knot within the enclosed slot 17 in abutment against the slot second terminal end 19 that is positioned adjacent the second spool end 13.

Figure 2:
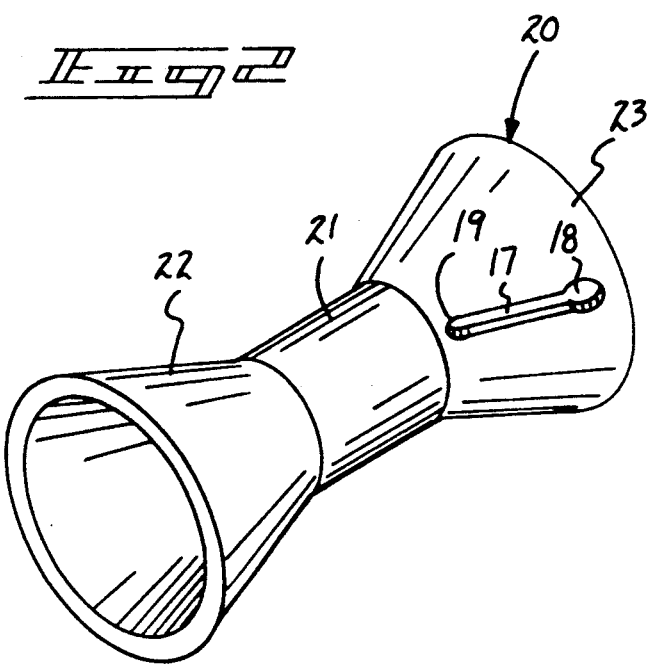
FIG. 2 is an isometric illustration of a modification of the instant invention.

A modified spool structure is illustrated in FIG. 2, wherein a central spool cylinder 21 includes respective first and second conical spool portions 22 and 23 that are coaxially aligned relative to the central spool cylinder 21. The slot 17 is positioned with the second terminal end 19 positioned adjacent the spool cylinder 21 and the first terminal end 18 positioned adjacent a free terminal end of the second conical spool portion 23 to direct the fishing line 9 adjacent the central spool cylinder 21 for its subsequent winding thereabout.

FIGS. 3-5 illustrate the use of an insert member 24 mounted within the slot 17 and cylindrical slot first terminal end 18 that is complementary to the continuous side wall 17a of the slot 17 and first terminal end 18. The insert member 24 includes respective first and second parallel legs 25 and 26 defining the central slot 17, wherein the parallel first and second legs 25 and 26 include a plurality of equally spaced arcuate projections 27 directed from the first leg 25 towards the second leg 26 to enhance arresting of the fishing line when directed within the slot 17. The insert member 24 is defined by an insert slot 28 between the spaced parallel legs 25 and 26 diametrically aligned with a cylindrical first opening 28a that is complementarily received within the cylindrical slot first terminal end 18, as illustrated.

Figure 6:
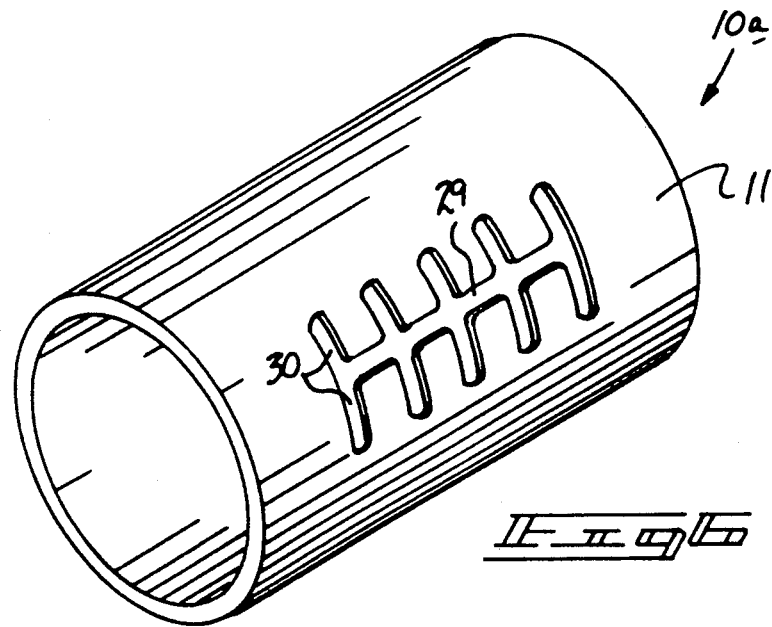
FIG. 6 is an isometric illustration of a modification of the invention.
Figure 7:
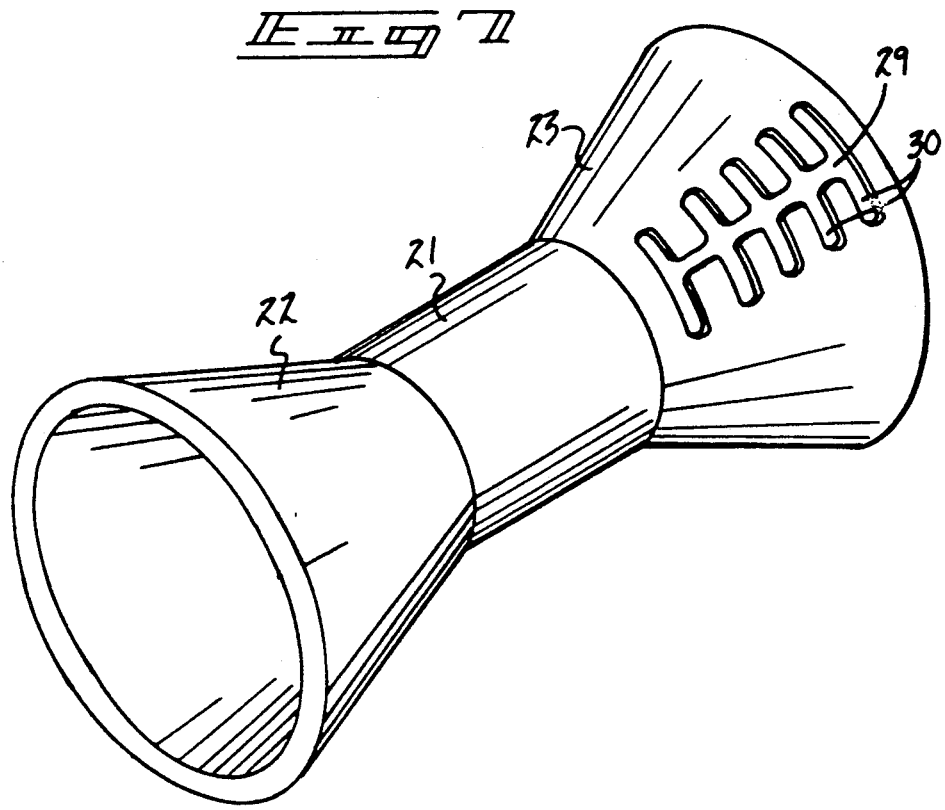
FIG. 7 is an isometric illustration of the modified slide structure mounted within a conical end portion of the spool structure, as illustrated.

FIGS. 6-8 illustrate a modified aspect of the invention 10a, wherein a central first slot 29 oriented parallel relative to the axis of the cylinder 11 includes a plurality of parallel second slots intersecting the first slot, wherein the second slots are arranged parallel relative to one another and are orthogonally oriented relative to the slot 29. The second slots 30 are defined by a second slot first side edges 31 spaced from and parallel a second slot second side edge 32. The first and second side edges project above and below the central first slot 29. The first side edges 31 oriented above the central first slot 29 include arcuate projections 33, wherein the second slot second side edges 32 positioned below the central first slot 29 include the arcuate projections 33. The respective second side edges 32 above the slot 29 and the first side edges 31 below the slot 29 are of an uninterrupted linear configuration as illustrated to permit directing of the fishing line above or below the central slot 29 for selective mounting of the knotted fishing line as desired prior to a winding procedure. This organization particularly permits the spool to be utilized in a reversible manner within a complementary reel structure to accept the spool 10a in a desired orientation.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing reel spool, comprising,
  a central cylindrical spool, the central cylindrical spool including a first spool end and a second spool end, the first spool end including a first flange mounted thereto, and the second spool end including a second flange mounted thereto, and
  the central cylindrical spool defined about a spool axis, and each of the first and second flanges are orthogonally oriented relative to the spool axis, and the spool including a cylindrical spool cavity defined interiorly of a cylindrical spool wall, and the spool wall including a throughextending elongate enclosed slot, the enclosed slot oriented parallel relative to the spool axle, and the enclosed slot including a first terminal end and a second terminal end, the first terminal end having a cylindrical slot opening in communication with the elongate enclosed slot, wherein the elongate enclosed slot diametrically intersects the cylindrical slot opening, and the elongate enclosed slot is defined by a predetermined width and the cylindrical slot opening is defined by a predetermined diameter, the predetermined diameter substantially greater than the predetermined width, and the elongate enclosed slot includes a plurality of parallel second slots intersecting the elongate enclosed slot, the elongate enclosed slot having a first side and a second side and each of the second slots project orthogonally beyond the first side and the second side of the elongate enclosed slot, and each second slot includes a slot first side edge and a slot second side edge, each second slot first side edge oriented beyond the first side of the elongate enclosed slot includes a plurality of arcuate projections, and each second slot second side edge oriented beyond the second side of the elongate enclosed slot includes a further plurality of arcuate projections, and each second slot second side edge oriented beyond the first side of the elongate enclosed slot and the second slot first side edge oriented beyond the second side of the elongate enclosed slot define respective uninterrupted surfaces in confrontation with the respective arcuate projections and the further arcuate projections respectively.

* * * * *